United States Patent
Elsayed et al.

(10) Patent No.: US 12,265,911 B2
(45) Date of Patent: Apr. 1, 2025

(54) NEURAL NETWORK LAYERS WITH A CONTROLLED DEGREE OF SPATIAL INVARIANCE

(71) Applicant: Google LLC, Mountain View, CA (US)

(72) Inventors: Gamaleldin Elsayed, Milpitas, CA (US); Prajit Ramachandran, Santa Clara, CA (US); Jon Shlens, San Francisco, CA (US); Simon Kornblith, Toronto (CA)

(73) Assignee: GOOGLE LLC, Mountain View, CA (US)

( * ) Notice: Subject to any disclaimer, the term of this patent is extended or adjusted under 35 U.S.C. 154(b) by 1143 days.

(21) Appl. No.: 17/121,161

(22) Filed: Dec. 14, 2020

(65) Prior Publication Data

US 2021/0248472 A1    Aug. 12, 2021

Related U.S. Application Data

(60) Provisional application No. 62/970,826, filed on Feb. 6, 2020.

(51) Int. Cl.
*G06N 3/08* (2023.01)
*G06N 3/04* (2023.01)
*G06N 3/082* (2023.01)

(52) U.S. Cl.
CPC .............. *G06N 3/082* (2013.01); *G06N 3/04* (2013.01)

(58) Field of Classification Search
CPC ........ G06N 3/082; G06N 3/04; G06N 3/0464; G06N 3/0475; G06N 3/0495; G06N 3/0499
See application file for complete search history.

(56) References Cited

U.S. PATENT DOCUMENTS 11,467,239 B2 * 10/2022 Schlemper ............ G06T 11/006
2016/0019458 A1 * 1/2016 Kaufhold ............ G01S 13/9029
706/20

(Continued)

FOREIGN PATENT DOCUMENTS

CN          110462637 B  *  7/2022  ........... G06N 3/0454
KR       20200030988 A  *  3/2020  ............. G06N 3/045

(Continued)

OTHER PUBLICATIONS

CS231, "CS231n Convolutional Neural Networks for Visual Recognition", Dec. 31, 2018, pp. 1-23 (Year: 2018).*

*Primary Examiner* — Paulinho E Smith
(74) *Attorney, Agent, or Firm* — DORITY & MANNING P.A.

(57) ABSTRACT

A computing system can include one or more non-transitory computer-readable media that collectively store a neural network including one or more layers with relaxed spatial invariance. Each of the one or more layers can be configured to receive a respective layer input. Each of the one or more layers can be configured to convolve a plurality of different kernels against the respective layer input to generate a plurality of intermediate outputs, each of the plurality of intermediate outputs having a plurality of portions. Each of the one or more layers can be configured to apply, for each of the plurality of intermediate outputs, a respective plurality of weights respectively associated with the plurality of portions to generate a respective weighted output. Each of the one or more layers can be configured to generate a respective layer output based on the weighted outputs.

20 Claims, 9 Drawing Sheets

(56) References Cited

U.S. PATENT DOCUMENTS

| | | | | |
|---|---|---|---|---|
| 2019/0050715 | A1* | 2/2019 | Ooi | G06N 3/063 |
| 2019/0147234 | A1* | 5/2019 | Kicanaoglu | G06N 3/047 |
| | | | | 382/218 |
| 2019/0325340 | A1* | 10/2019 | Nitta | G06Q 10/109 |
| 2021/0128084 | A1* | 5/2021 | Dai | G06T 7/0012 |
| 2021/0358611 | A1* | 11/2021 | Liao | G06N 3/08 |
| 2022/0004841 | A1* | 1/2022 | Lee | G06N 3/044 |
| 2022/0129740 | A1* | 4/2022 | Yang | G06N 3/063 |

FOREIGN PATENT DOCUMENTS

| | | | | |
|---|---|---|---|---|
| WO | WO-2018073975 | A1 * | 4/2018 | |
| WO | WO-2019116291 | A1 * | 6/2019 | G06K 9/6256 |

* cited by examiner

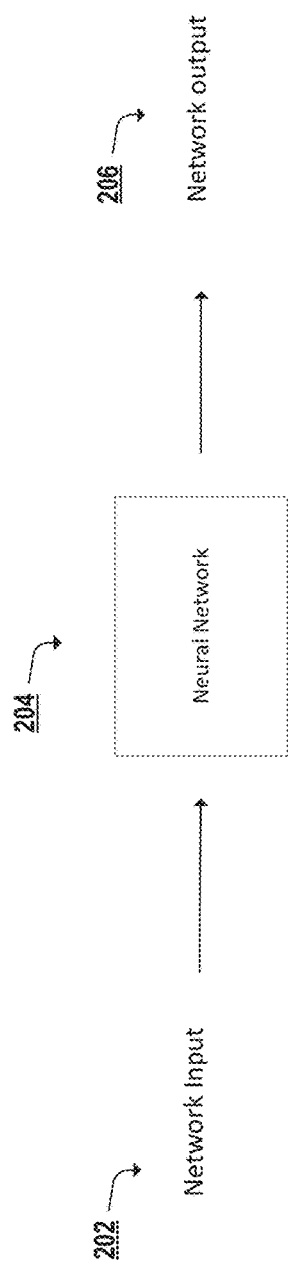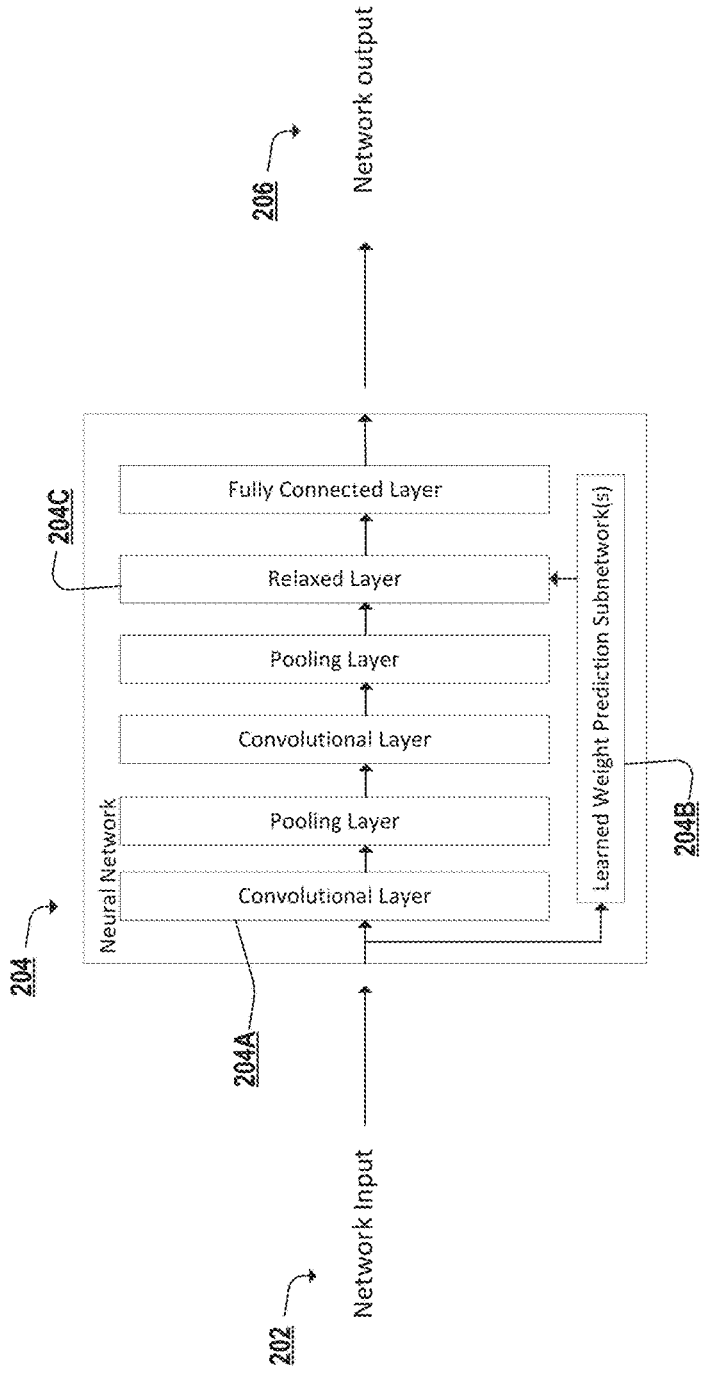

NEURAL NETWORK LAYERS WITH A CONTROLLED DEGREE OF SPATIAL INVARIANCE

RELATED APPLICATION

The present application is based on and claims benefit of U.S. Provisional Patent Application No. 62/970,826 having a filing date of Feb. 6, 2020, which is incorporated by reference herein.

FIELD

The present disclosure relates generally to neural networks. More particularly, the present disclosure relates to neural network layers utilizing weighted combinations of kernels to relax spatial invariance of the network layers.

BACKGROUND

Artificial neural networks (also referred to simply as "neural networks") are a class of machine-learned models that are especially powerful, accurate, or otherwise high-performing for various tasks. An artificial neural network can include a group of connected nodes, which can also be referred to as (artificial) neurons or perceptrons. An artificial neural network can be organized into one or more layers. Artificial neural networks that include multiple layers can be referred to as "deep" networks.

Example artificial neural networks include feed-forward neural networks, recurrent neural networks, convolutional neural networks, other forms of artificial neural networks, or combinations thereof. Each of these example types has different internal structures or "architectures" that enable, in part, the particular benefits provided by that type of artificial neural network. For example, the architecture of an artificial neural network can correspond to or include the structure, arrangement, number, types, behavior, operations performed by, and/or other properties of the neurons or layers of neurons included in the network.

Neural networks, in particular, are commonly utilized to recognize objects or areas of interest in an input (e.g., recognizing an animal in an image, words in human speech, etc.) due to their spatial invariance. More particularly, neural networks which feature spatial invariance within their layers are successful at recognizing objects regardless of the spatial location of the object in the input (e.g., an object being on the left side of an image or a right side of an image, etc.). The spatial invariance of convolutional neural networks is primarily credited to weight sharing between parameters in the network.

SUMMARY

Aspects and advantages of embodiments of the present disclosure will be set forth in part in the following description, or can be learned from the description, or can be learned through practice of the embodiments.

One example aspect of the present disclosure is directed to a computing system. The computing system can include one or more processors and one or more non-transitory computer-readable media. The one or more non-transitory computer-readable media can collectively store a neural network including one or more layers with relaxed spatial invariance. Each of the one or more layers can be configured to receive a respective layer input. Each of the one or more layers can be configured to convolve a plurality of different kernels against the respective layer input to generate a plurality of intermediate outputs, each of the plurality of intermediate outputs having a plurality of portions. Each of the one or more layers can be configured to apply, for each of the plurality of intermediate outputs, a respective plurality of weights respectively associated with the plurality of portions to generate a respective weighted output. Each of the one or more layers can be configured to generate a respective layer output based on the weighted outputs. The one or more non-transitory computer-readable media can collectively store instructions that, when executed by the one or more processors, cause the computing system to perform operations. The operations can include using the neural network to process a network input to generate a network output.

Another example aspect of the present disclosure is directed to a computer-implemented method. The computer-implemented method can include obtaining, by one or more computing devices, a neural network comprising one or more layers with relaxed spatial invariance. Each of the one or more layers can be configured to receive a respective layer input. Each of the one or more layers can be configured to convolve a plurality of different kernels against the respective layer input to generate a plurality of intermediate outputs, each of the plurality of intermediate outputs having a plurality of portions. Each of the one or more layers can be configured to apply, for each of the plurality of intermediate outputs, a respective plurality of weights respectively associated with the plurality of portions to generate a respective weighted output. Each of the one or more layers can be configured to generate a respective layer output based on the weighted outputs. The computer-implemented method can include obtaining, by the one or more computing devices, a network input. The computer-implemented method can include processing, by the one or more computing devices, the network input using the neural network to receive a network output. The computer-implemented method can include evaluating, by the one or more computing devices, a loss function that evaluates a difference between the network output and a ground truth associated with network output. The computer-implemented method can include modifying, by the one or more computing devices and based on the loss function, one or more values. The one or more values can be modified for one or both of one or more parameters of at least one kernel of the plurality of different kernels or one or more of the respective plurality of weights for at least one kernel of the plurality of different kernels.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 2A depicts a flow chart diagram of an example neural network according to example embodiments of the present disclosure.

FIG. 2B depicts a block diagram of another example neural network including one or more layers with relaxed spatial invariance and one or more learned subnetworks according to example embodiments of the present disclosure.

Figure 1A:
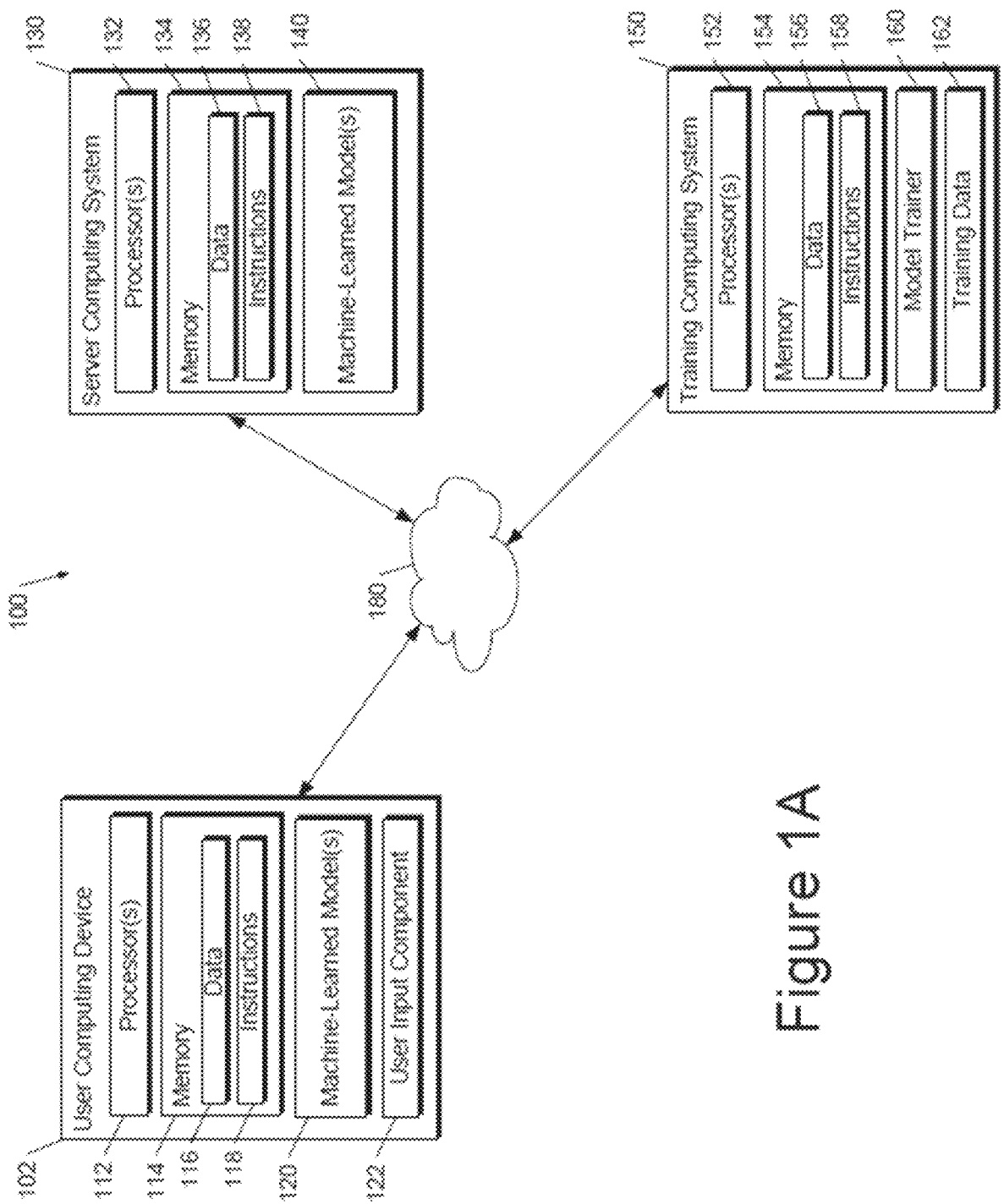
FIG. 1A depicts a block diagram of an example computing device according to example embodiments of the present disclosure.

Reference numerals that are repeated across plural figures are intended to identify the same features in various implementations.

DETAILED DESCRIPTION

Generally, the present disclosure is directed to a neural network layer architecture for relaxing the spatial invariance of the network. By relaxing the spatial invariance of a neural network, object identification/recognition performance can be increased substantially, thereby allowing for more accurate object recognition while retaining a degree of spatial invariance sufficient to recognize spatially variant objects or inputs.

More particularly, neural networks have been widely regarded in the field as superior to other classes of machine-learned models for the purpose of object recognition (e.g., objects in images, speech, etc.). This superiority is largely credited to the spatial invariance of the convolutional neural networks, which is enforced in part through weight sharing between parameters of the network (See E. P. Simoncelli, M. S. Livingstone, *Natural image statistics and neural representation*, Nature Neuroscience, 17(12):1776 (2014)). More specifically, a layer of a typical convolutional neural network can convolve all segments of an input using a discrete kernel with distinct weights, thereby applying the same weights (e.g., kernel, etc.) to each spatial location of an input. As an example, for an input image, a convolutional neural network layer would convolve every spatial location of the input image with the same kernel(s). In such fashion, the spatial invariance of the convolutional neural network can be enforced (e.g., the CNN can recognize features of an object regardless of the spatial location of the object.).

It should be noted that contemporary approaches in the field of neural networks generally theorize that relaxation of spatial invariance leads to degradation of "predictive performance." (See E. P. Simoncelli, M. S. Livingstone, *Natural image statistics and neural representation*, Nature Neuroscience, 17(12):1776 (2014)). As such, the introduction of a degree of spatial invariance relaxation has not been previously attempted in this field. The present disclosure seeks to introduce relaxation of spatial invariance to increase neural network performance. More particularly, the present disclosure introduces a low-rank locally connected neural network layer configured to provide a controllable degree of relaxation to the spatial invariance of the network.

More particularly, a neural network can include one or more layers with relaxed spatial invariance (e.g., low rank locally connected layers). The neural network can be configured to receive a respective layer input. In some implementations, a respective layer input can be a network input or can be an output from a previous layer of the network representing a lower dimensional representation of a network input. A network input (e.g., an input to the neural network) can be an image, a video, a document, audio, a point cloud, medical imaging data, medical examination and/or diagnostic text, a spectrogram dataset, or any other form of input that can be processed by the network. Further, the network input and/or the respective layer input can, in some implementations, be represented using one or more dimensions and/or channels (e.g., a height, width, depth, channels, etc.). As an example, a network image input can be represented with a height dimension, a width dimension, and a depth dimension corresponding to RGB values of the input image. In some implementations, the layer (e.g., the low rank locally connected layer) can be similar to or modified from a convolutional layer.

The layer(s) can be further configured to a plurality of different kernels against the respective layer input to generate a plurality of intermediate outputs. A kernel can include a matrix or tensor of values defined by height and width dimensions and a depth dimension which may correspond to a number of channels. Solely for simplicity of explanation, example kernels will be discussed herein with depth equal to 1, however, the different kernels described herein can have a depth value greater than one as well, depending on implementation choices. To provide an example, a kernel can have a height of 2 and a width of 2, and can include 4 values (e.g., 1,0,0,1, etc.). The kernel can be of any dimensions less than, equal, or greater to the respective dimensions of the respective layer input. As an example, a respective layer input may have dimensions of 55×55 while a kernel may have dimensions of 5×5. In some implementations, each kernel of the plurality of kernels can have different values and/or dimensions. As an example, a first kernel may have a height of 3 and a width of 4, while a second kernel can have a height of 5 and a width of 3, each of the first and second kernel having different values and/or identical values in some locations of the kernel matrix. Each kernel of the plurality of kernels can be convolved against the respective layer input to generate a plurality of intermediate outputs. In some implementations, each intermediate output can correspond to the convolution of a kernel across the respective layer input. As an example, four kernels being convolved against the respective layer input can generate four intermediate outputs that are respectively associated with the four kernels.

Each of the intermediate outputs can have a plurality of portions. As an example, each intermediate output with dimensions of 50×50 can include 2,500 portions that correspond to the 2,500 cells of the intermediate output. Alternatively, some portions can include multiple cells from the intermediate output. As one example, an intermediate output can include four equal portions of 25×25. In such fashion, each of the intermediate outputs can be divided into the same quantity and dimensionality of portions. In some implementations, the dimensionality and/or quantity of portions can be modified. As an example, the intermediate outputs can have 15 different portions of various dimensions to more accurately identify objects in the intermediate output. In some implementations, the dimensionality and/or quantity of portions can be trained/learned, as will be discussed in greater detail with reference to the figures.

Each of the layer(s) can be configured to apply a respective plurality of weights for each of the plurality of intermediate outputs. The respective plurality of weights can be respectively associated with the plurality of portions. As an example, a first intermediate output can include four portions, and a plurality of weights can be respectively applied to each of the portions (e.g., applying a weight of 0.3 to a first portion, a weight of 0.7 to a second portion, a weight of 0.2 to a third portion, a weight of 0.5 to a fourth portion, etc.). A second intermediate output can include four portions, and a plurality of different and/or identical weights can be respectively applied to those portions.

In some implementations, the respective plurality of weights for each of the intermediate outputs can include a plurality of sums respectively of a plurality of row weight values and a plurality of column weight values. More particularly, weights can be respectively associated with values included in the intermediate output matrix. As an example, a 5×5 intermediate output matrix can include 25 values, each with respectively associated weights (e.g., 25 weights). Each of the weights can be a function of a row and column weight value for the intermediate output matrix. In such fashion, a 5×5 intermediate output matrix would, for example, include 5 row values and 5 column values, which can be used to produce the 25 weight values. These row and column values can be included in the respective plurality of weights for an intermediate output. For example, the row and column weights can be the learned weight values, thereby reducing the parameter size of the model (e.g., a reduction from 25 to 10 for the example weights).

In some implementations, the weights applied to the portions of the intermediate outputs can include a respective plurality of learned weight parameter values (e.g., a scalar value associated with each portion, a plurality of scalar values associated with each portion, etc.). In such fashion, the learned weight parameter values can be trained, as will be discussed in greater detail with regards to the figures.

In some implementations, at least one of the layer(s) can include one or more learned subnetworks that receive one or more portions of the respective layer input and, in response, predict the plurality of weights for one or more of the intermediate outputs. More particularly, learned subnetwork(s) can receive portion(s) of the respective layer input (e.g., an image, video, etc.). Based on the portions of the respective layer input, the learned subnetwork(s) can predict the plurality of weights for the intermediate output(s). As an example, the respective layer input can include an image depicting a bird in flight in the top middle portion of the image. Based on that input image, the learned subnetwork(s) can predict that the intermediate outputs associated with some kernels are more suited to recognize the depicted object, and can accordingly predict relatively higher weights for those kernels. Conversely, the learned subnetwork(s) can predict that the intermediate outputs associated with some kernels are less suited to recognize the depicted object, and can accordingly predict relatively lower weights for the intermediate outputs produced by those kernels. As discussed previously, the weights predicted by the learned subnetwork(s) can be, for example, scalar values associated with portions of the intermediate outputs. As an example, the weights predicted to be higher and/or lower in the previous example may only be associated with the portion(s) of the intermediate outputs that include the object. The learned subnetwork(s) can be trained, as will be discussed in greater detail with reference to the figures.

By applying the respective plurality of weights to the plurality of portions, the layer(s) can generate a respective weighted output. More particularly, a respective weighted output can be generated from an intermediate output by applying the plurality of respective weights to the portions of the intermediate output. As an example, weights of 0.5, 0.3, 0.1, and 0.9 can be respectively applied to the four portions of an intermediate output, generating a respective weighted output that includes the values of the intermediate output as they were modified by the application of the respective weights.

The layer(s) can be configured to generate a respective layer output based on the weighted outputs. More particularly, each of the plurality of respective weighted outputs can be combined to generate a respective layer output. As an example, four respective weighted outputs can each have four portions. The first portions of each of the respective weighted outputs can have been generated by applying weights 0.2, 0.5, 0.1, and 0.2 to the first portions of the respective intermediate outputs. The first portion of the respective layer output can be generated by combining (e.g., summing) the first portions of the four respective weighted outputs. In such fashion, the respective layer output can be a combination of the intermediate outputs (e.g., the initial kernel convolutions applied to the respective layer input), with each of the intermediate outputs contributing at varying degrees (e.g., weights) at certain spatial locations (e.g., portions) of the respective layer output.

In some implementations, each of the layer(s) can be configured to apply a respective bias to each of the respective weighted outputs when generating the respective layer output. The respective bias can include a plurality of bias values that are respectively associated with the plurality of rows and columns of the respective layer output. Additionally, or alternatively, in some implementations, the respective bias can include a plurality of bias values that are respectively associated with the plurality of channels of the respective layer output. In a fashion substantially similar to the respective plurality of weights, the plurality of bias values can be added to standard channel bias. As an example, the layer biases can be defined as:

$$B_{i,j,c} = b_i^{row} + b_j^{column} + b_c^{channel}$$

wherein bROW∈RH, bCOLUMN∈RW, and bCHANNEL∈RCout.

In such fashion, the neural network can be used to process a network input (e.g., an image, etc.) and generate a network output (e.g., recognition of one or more objects depicted in the image, etc.). More particularly, the network output can be a convolutional "composite" of the convolutional outputs (e.g., intermediate outputs) associated with each kernel of the plurality of kernels. The "contribution" of each intermediate output in the convolutional "composite" can be based on the respective weights associated with each portion of each intermediate output.

As discussed previously, traditional layers are spatially invariant due to the convolution of kernels against the entirety of an input. By convolving the kernel against all spatial locations of an input, the "weights" of the kernel area shared across the output of the layer (e.g., feature map, etc.). Locally connected layers, conversely, are spatially variant due to confining the convolution of various kernels to certain portions of an input (e.g., a first kernel would only be convolved against a first portion of an input). By training the degree of "contributions" from different kernels for a portion (e.g., spatial location, etc.) of an input, the layer(s) of the present disclosure (e.g., "low-rank locally connected layers") can relax spatial invariance to the most optimal degree possible while still maintaining a degree of spatial invariance sufficient for input processing.

It should be noted that the layer(s) of the present disclosure are not necessarily the only layers to be included in a neural network. A neural network can include both layers with relaxed spatial invariance and more "traditional" layers. In addition, the example neural network can also include layers typically found in such networks (e.g., activation layers, pooling layers, fully connected layers, etc.). As an example, a neural network may only incorporate a single layer with relaxed spatial invariance (e.g., as the last layer, etc.). As another example, a neural network may omit "traditional" layers entirely and only utilize layers with relaxed spatial invariance. In such fashion, the composition of the network can be modified to suit various circumstances.

The layers with relaxed spatial invariance can be trained based on a loss function that evaluates a difference between a training output of the neural network and a ground truth associated with the training output. More particularly, parameters of the layer(s) (e.g., kernel weights, a spatial rank parameter, bias values, etc.) can be modified based on the loss function. Additionally, or alternatively, learned weight prediction subnetwork(s) can be trained in a substantially similar fashion based on the loss function. The specifics of training the layer(s) and/or the learned subnetwork(s) will be discussed in greater detail with regards to the figures.

The provisional application 62/970,826, to which this disclosure claims priority and which is incorporated into and forms a portion of this disclosure, describes example implementations of the systems and methods described herein and example experimental results therefor.

The present disclosure provides a number of technical effects and benefits. As one example, the systems and methods of the present disclosure are able to generate network outputs (e.g., recognition of objects, etc.) with a substantially greater degree of accuracy in comparison to traditional neural network layers. Accordingly, the accuracy of the disclosed layers can enable new technologies (e.g., autonomous driving, etc.) that require the most accurate results possible. Thus, as an example technical effect and benefit, the layer described herein can more accurately process inputs (e.g., images obtained from autonomous vehicle sensors, human speech from a personal assistant application, etc.) and therefore increase the efficiency and performance of applications that rely on object recognition.

Another example technical effect and benefit is the ability to reduce the number of parameters included in a neural network while maintaining equivalent performance. By reducing the number of parameters included in a network, the network can consume fewer computing resources such as reduced storage requirements, processing requirements, and/or bandwidth requirements.

With reference now to the Figures, example embodiments of the present disclosure will be discussed in further detail.

Example Devices and Systems

FIG. 1A depicts a block diagram of an example computing system 100 that includes neural networks according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more machine-learned models 120. For example, the machine-learned models 120 can be or can otherwise include various machine-learned models such as neural networks (e.g., neural networks including layers with relaxed spatial invariance) or other multi-layer non-linear models. Neural networks can include recurrent neural networks (e.g., long short-term memory recurrent neural networks), feed-forward neural networks, or other forms of neural networks. Example machine-learned models 120 are discussed with reference to FIGS. 2A and 2B.

In some implementations, the one or more machine-learned models 120 can be received from the server computing system 130 over network 180, stored in the user computing device memory 114, and the used or otherwise implemented by the one or more processors 112. In some implementations, the user computing device 102 can implement multiple parallel instances of a single machine-learned model 120 (e.g., to perform parallel object recognition).

More particularly, the machine-learned model 120 can be configured to detect objects in a network input. The network input can be or otherwise include an image, a video, a document, audio, a point cloud, medical imaging data, medical examination and/or diagnostic text, a spectrogram dataset, or any other form of input that can be processed by the network. The network input can be received from an associated user computing device 102 (e.g., smartphone).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., an object detection and/or augmented reality service). Thus, one or more machine-learned models 120 can be stored and implemented at the user computing device 102 and/or one or more machine-learned models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise includes one or more machine-learned models 140. For example, the models 140 can be or can otherwise include various machine-learned models such as neural networks (e.g., deep recurrent neural networks) or other multi-layer non-linear models. Example models 140 are discussed with reference to FIGS. 2A and 2B.

The server computing system 130 can train the models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained. In particular, the model trainer 160 can train a machine-learned models model 140 based on a set of training data 142.

In some implementations, if the user has provided consent, the training examples can be provided by the user computing device 102 (e.g., based on communications previously provided by the user of the user computing device 102). Thus, in such implementations, the model 120 provided to the user computing device 102 can be trained by the training computing system 150 on user-specific communication data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
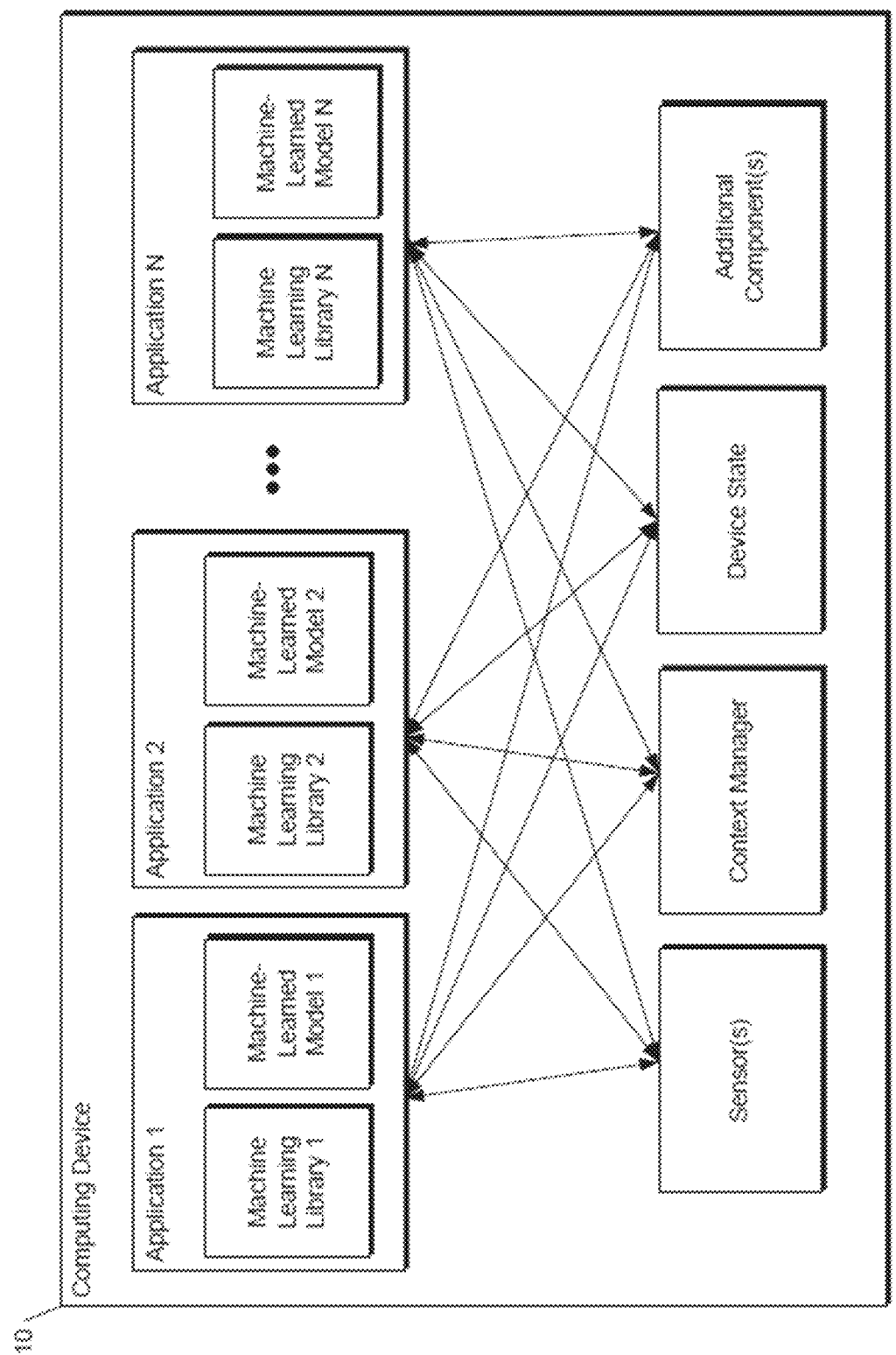
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
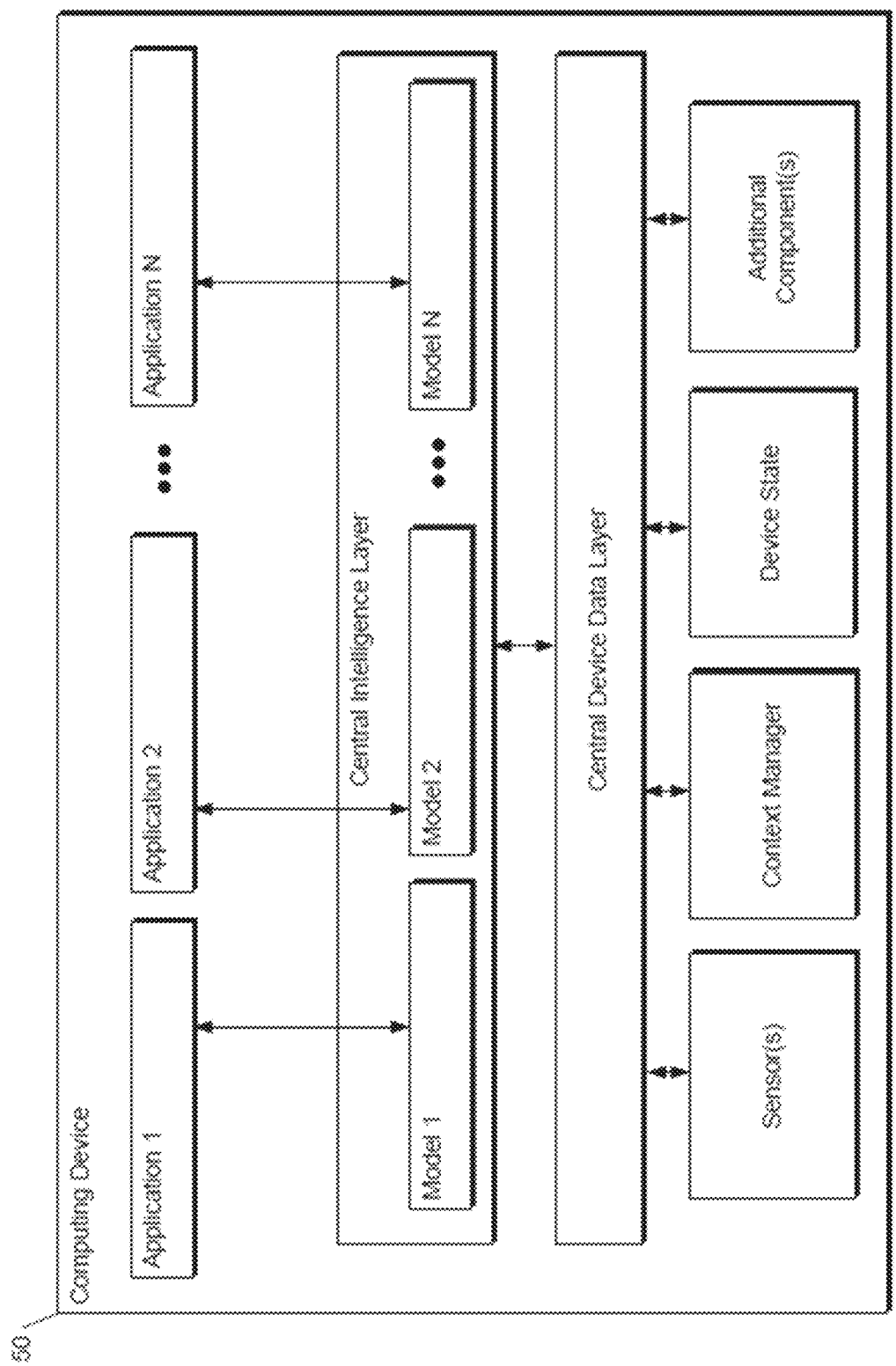
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

FIG. 2A depicts a flow chart diagram of an example neural network 204 according to example embodiments of the present disclosure. In some implementations, the neural network 204 is trained to receive a network input 202 descriptive of one or more inputs (e.g., images, video, etc.) and, as a result of receipt of the input data 202, provide network output 206 that describes the presence and/or locations of objects (e.g., features depicted in an image frame, frequencies included in an audio file, etc.).

FIG. 2B depicts a block diagram of another example neural network 204 including one or more layers with relaxed spatial invariance 204C and one or more learned subnetworks 204B according to example embodiments of the present disclosure. The neural network 204 can include a plurality of layers (e.g., layer 204A, pooling layer(s) fully connected layer(s), relaxed layer(s) 204C, etc.). As depicted, the neural network 204 includes both "traditional" layers (e.g., 204A) and layers with relaxed spatial invariance of the present disclosure (e.g., 204C). As discussed, a neural network architecture can include a composite of both "traditional" layers and "relaxed" layers, or can include only "relaxed" layers, in addition to other layers that are typically included in a neural network architecture (e.g., pooling layers, fully connected layers, etc.).

In addition, the neural network can include learned weight prediction subnetwork(s) 204B. Learned weight prediction subnetwork(s) 204B can in some implementations, be a "relaxed" layer. In some alternative implementations, the learned weight prediction subnetwork(s) 204B can be a different layer than a "relaxed" layer 204C, or existing outside the neural network 204 entirely. Both the "relaxed" layer 204C and the learned weight prediction subnetwork(s) can be trained simultaneously in an end-to-end fashion by evaluating a loss function, as will be discussed in greater detain with regards to FIG. 3.

Figure 3:
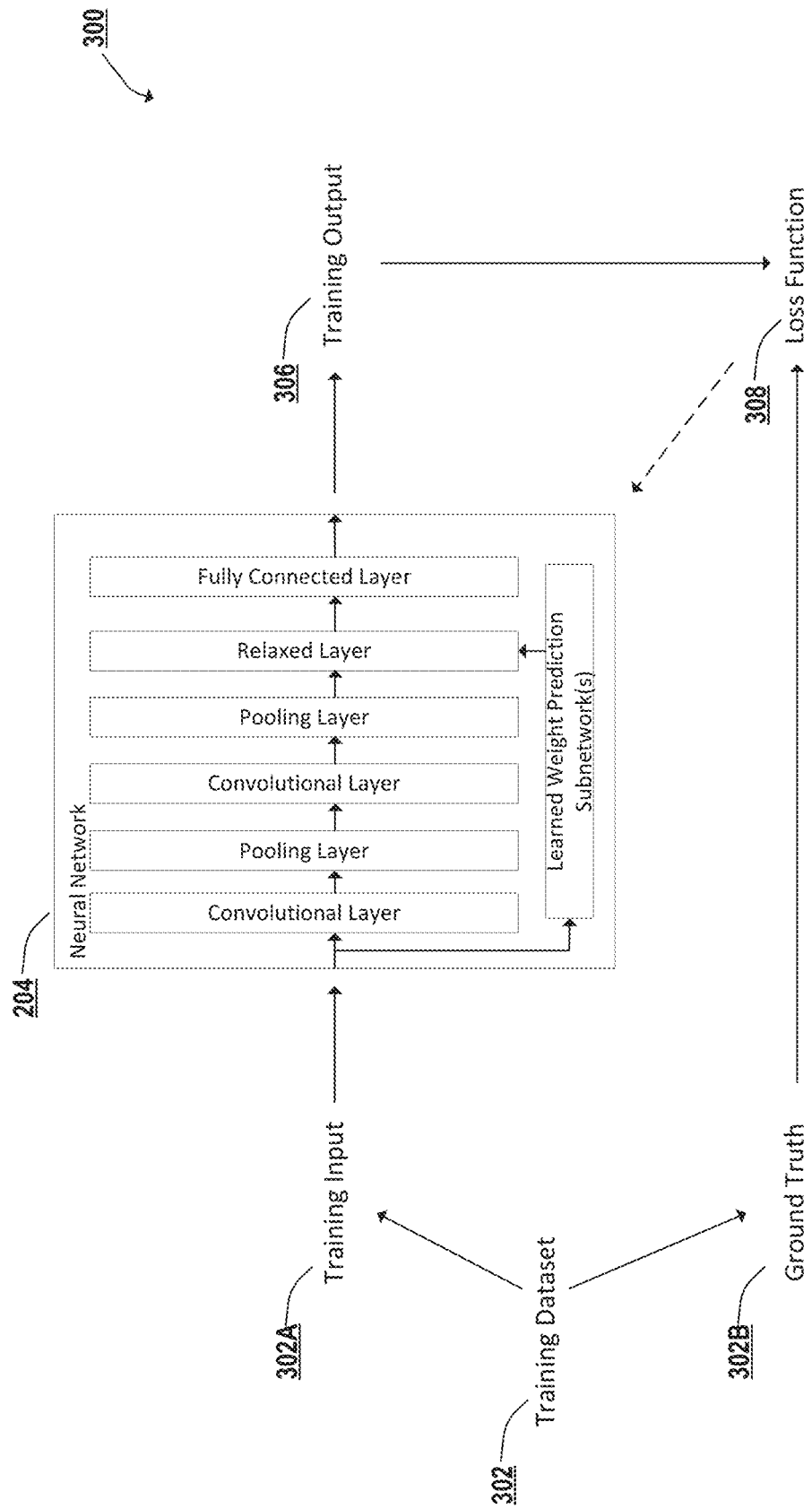
FIG. 3 depicts a flow diagram of an example method for training a neural network including one or more layers with relaxed spatial invariance and one or more learned subnetworks according to example embodiments of the present disclosure.

FIG. 3 depicts a flow diagram of an example method for training a neural network including one or more layers with relaxed spatial invariance and one or more learned subnetworks according to example embodiments of the present disclosure. In some implementations, the neural network 204 can be trained using a supervised learning approach. A training dataset 302 can include sets of training inputs 302A (e.g., training images, training text, etc.) that has an associated ground truth 302B. Therefore, the training output 306 provided by the neural network 204 for each training input 302A can be compared to the associated ground truth 302B using a loss function 308. The neural network 204 can be trained using the loss function 308 (e.g., a gradient thereof). For example, the values of the parameters of the relaxed layer and/or the learned weight prediction subnetwork(s) in the neural network 204 can be updated as the loss function 306 is backpropagated through the neural network 204. More particularly, the parameters of the layer(s) with relaxed spatial invariance can be modified based on the loss function that evaluates a difference between the training output 306 and the ground truth 302B associated with the training input 302A. Parameters of the layer(s) with relaxed spatial invariance can include, for instance, kernel parameters (e.g., height, width, channel depth, etc.), kernel weights, a spatial rank parameter (e.g., a parameter configured to partially control a number of applied kernels), bias value(s), and any other parameters associated with the layer(s) with relaxed spatial invariance. Additionally, or alternatively, one or more one or more subnetwork parameters included in one or more learned subnetworks included in at least one of the one or more layers can be updated based on the loss function.

Figure 4A:
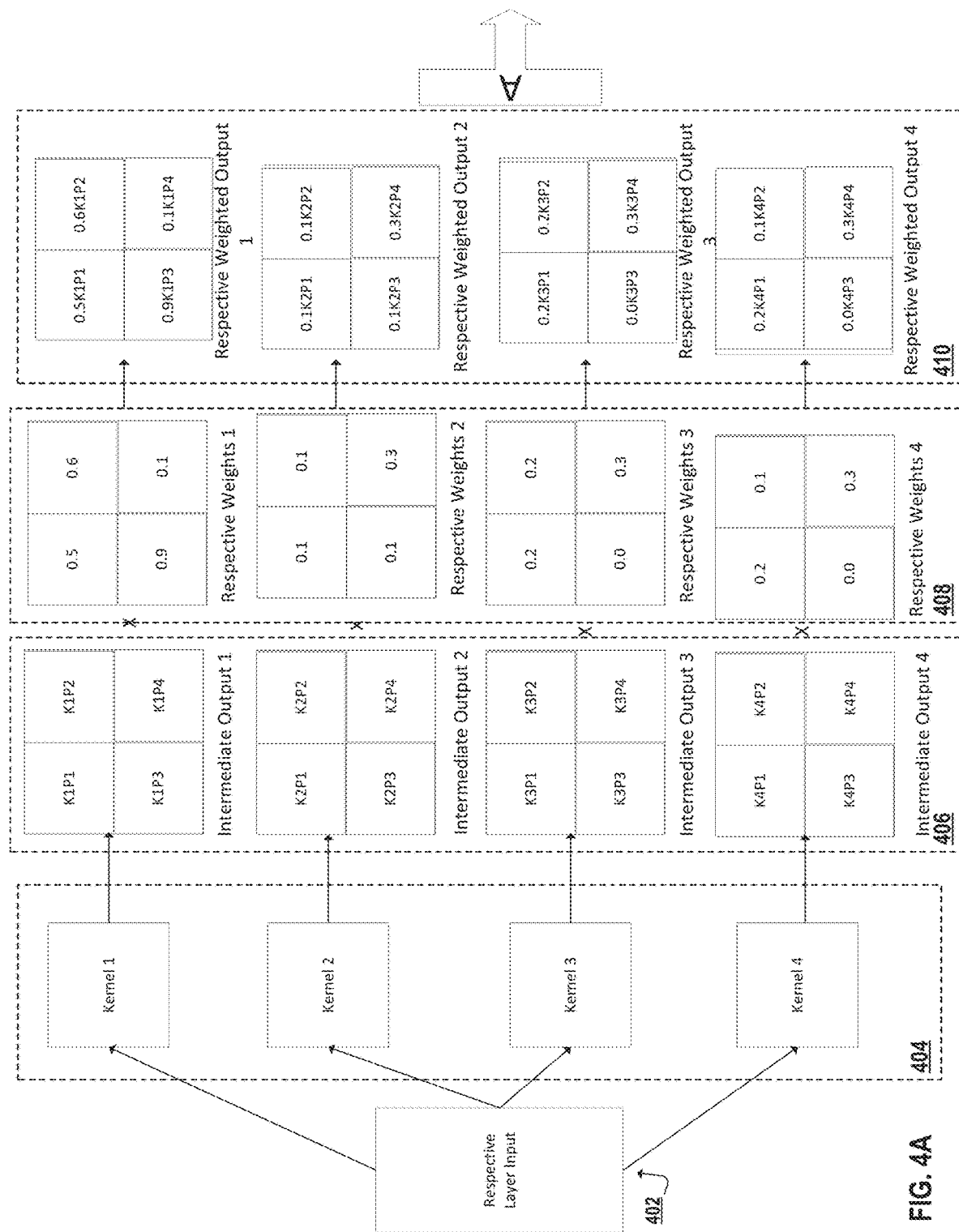
FIG. 4A depicts a block diagram depicting example operations of a layer with relaxed spatial invariance according to aspects of the present disclosure.

FIG. 4A depicts a block diagram depicting example operations of a layer with relaxed spatial invariance according to aspects of the present disclosure. Respective layer input 402 can be a network input or a output of a previous layer. As an example, the respective layer input 402 may be the output of a previous layer (e.g., "traditional" or "relaxed," etc.). The respective layer input can be convolved against a plurality of different kernels (e.g., kernels 404) to generate a plurality of intermediate outputs 406. Each of the intermediate outputs 406 (e.g., intermediate outputs 1-4) can have a plurality of portions. As an example, intermediate output 1 includes four portions (P1, P2, P3, P4). Further, as depicted, portions of an intermediate output can be labeled "K(number)" to indicate the convolutional kernel source of the intermediate output (e.g., the convolution of the respective layer input against kernel 1 would produce intermediate output 1 with portions "K1P1 (kernel 1 portion 1), K1P2 (kernel 2 portion 2), K1P3, K1P4," etc.). Each of the four intermediate outputs 406 can correspond to one of the four respective kernels 404.

Respective weights 408 can be applied to intermediate outputs 406. The respective weights can have weights associated with each portion of each intermediate output. As an example, respective weight 1, as depicted, has four weights (e.g., 0.5, 0.6, 0.9, 0.1, etc.) each corresponding with the respective portions of intermediate output 1. Similarly, respective weights 2-4 can have weights corresponding to the plurality of portions of intermediate outputs 2-4.

By applying respective weights 408 to the intermediate outputs 404, respective weighted outputs 410 can be generated. The respective weighted outputs are generated by applying each of the respective weights to their corresponding outputs. As an example, applying respective weights 1

(e.g., 0.5, 0.6, 0.9, 0.1) to intermediate output 1 (e.g., K1P1, K2P2, K1P3, K1P4) can generate respective weighted output 1 (e.g., 0.5K1P1, 0.6K1P2, 0.9K1P3, 0.1K1P4). It should be noted that the mathematical operations depicted are merely chosen for simplicity, and any other sort of mathematical operations can be utilized to apply the respective weights to their corresponding intermediate outputs to generate respective weighted outputs. Similarly, the specific division of portions as depicted is merely chosen for simplicity, and any sort of division into portions of any number and/or dimension can be utilized.

Figure 4B:
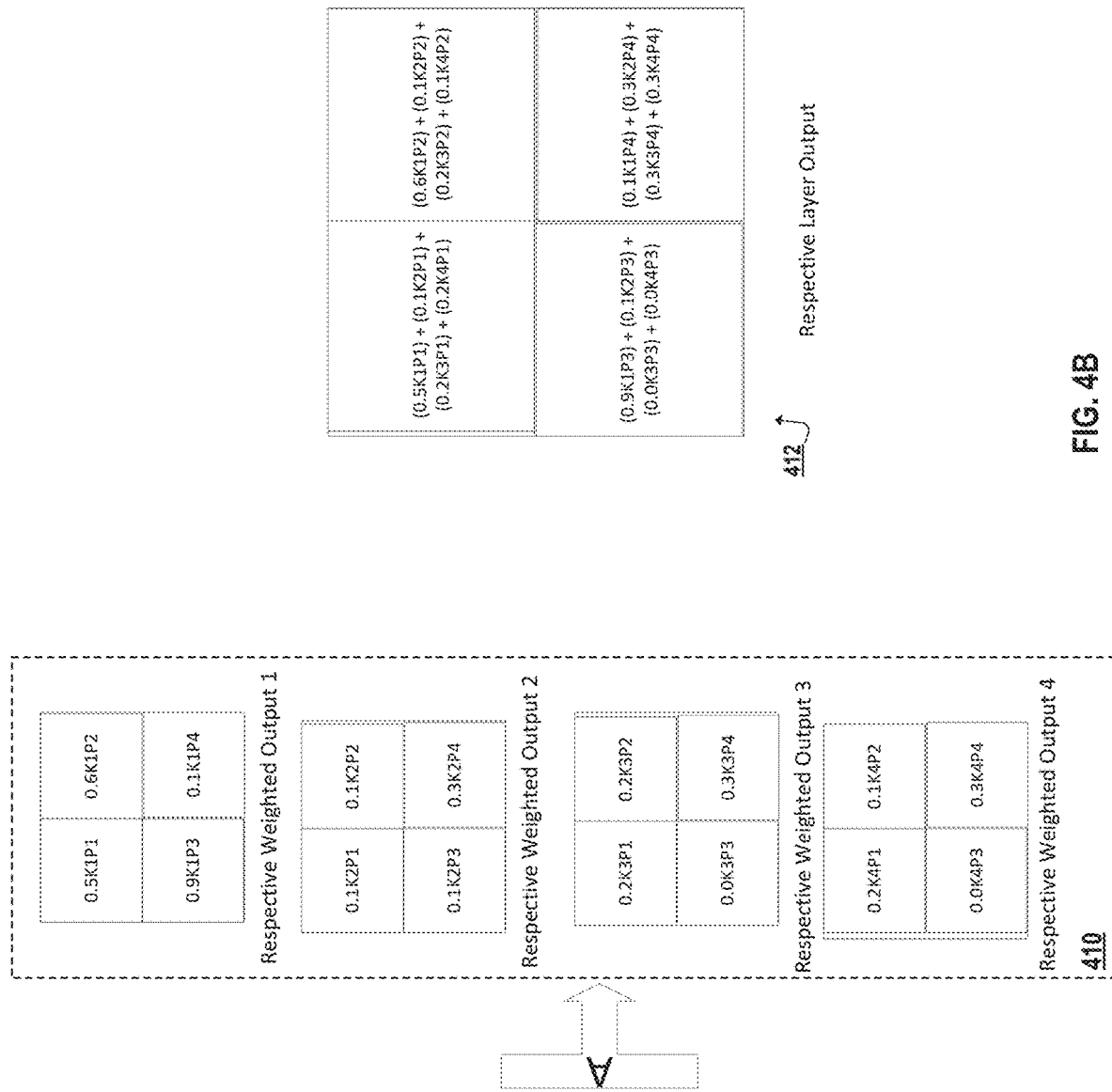
FIG. 4B depicts a block diagram depicting example operations of a layer with relaxed spatial invariance according to aspects of the present disclosure.

FIG. 4B depicts a block diagram depicting example operations of a layer with relaxed spatial invariance according to aspects of the present disclosure. A respective layer output 412 can be generated based on the respective weighted outputs 410. More particularly, the corresponding portions of each respective weighted output 410 can be used to generate a corresponding portion in the respective layer output 412. As an example, the first portions of respective weighted outputs 1-4 (e.g., 0.5K1P1, 0.1K2P1, 0.2K3P1, 0.2K4P1) can be summed to generate a corresponding first portion of the respective layer output 412. It should be noted that the mathematical operations depicted (e.g., summation) are merely chosen for simplicity, and any other sort of mathematical operations can be utilized to generate the portions of the respective layer output 412. Further, in some implementations, the respective layer output 412 is not required to possess a plurality of portions that correspond with the plurality of portions of respective weighted outputs 410. More particularly, the respective layer output can be a portionless lower dimensional representation of the respective layer input that is generated based on a certain composition of the various respective weighted outputs 410.

Figure 5:
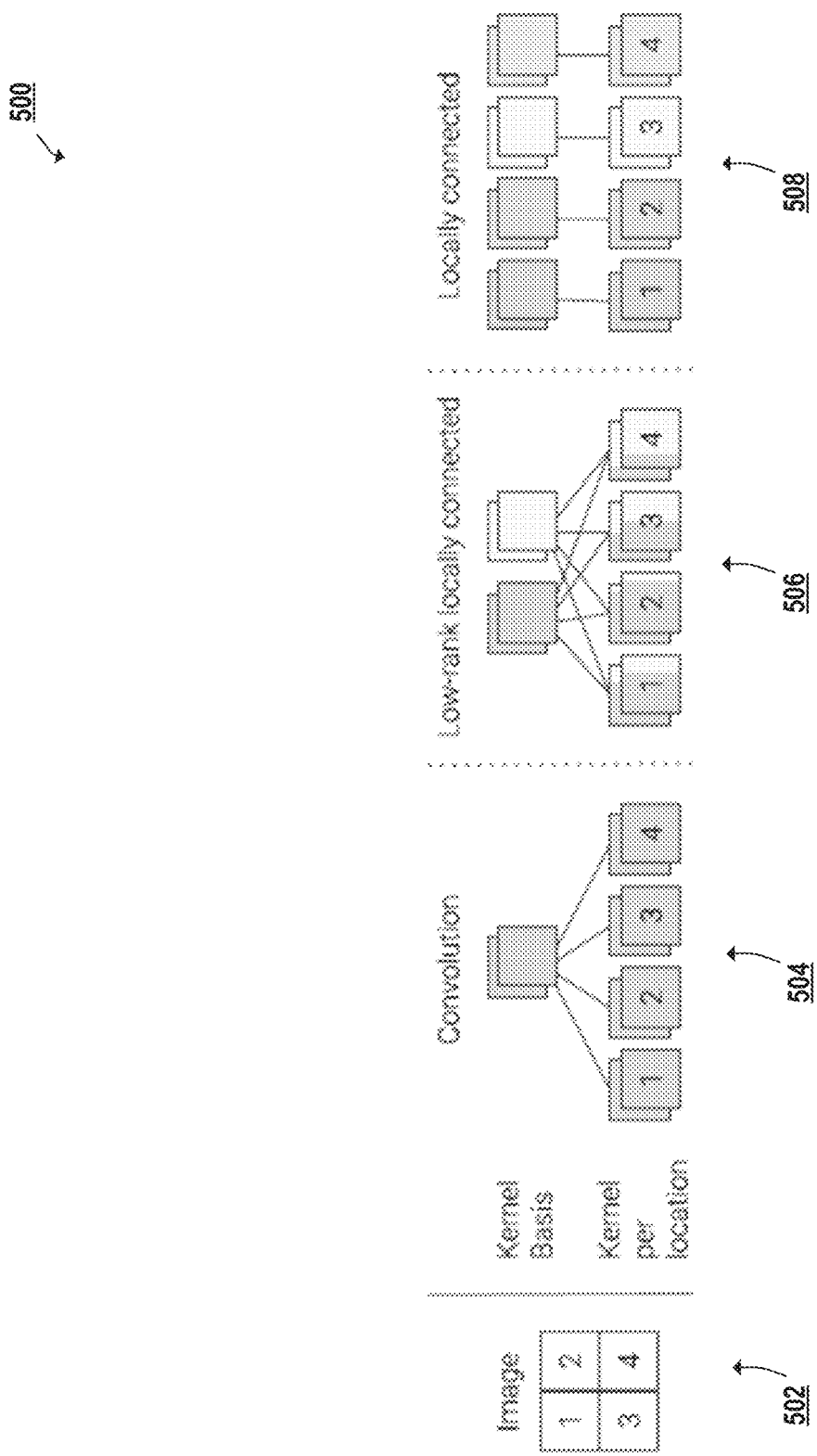
FIG. 5 depicts an example comparison between traditional neural network layers and layer(s) with relaxed spatial invariance.

FIG. 5 depicts an example comparison 500 between traditional neural network layers and layer(s) with relaxed spatial invariance. Layer 504 depicts a "traditional" layer. "Traditional" layers (e.g., layer 504) use the same kernel for each spatial location. As an example, each kernel (e.g., kernels 1-4) of layer 504 is convolved across every portion (e.g., portions 1-4) of image 502. As the weighting of each kernel in each spatial location is the same, there is a relatively high degree of spatial invariance in the layer. Conversely, locally connected layers learn a separate kernel for each spatial location (e.g., locally connected layer 508). As an example, the kernels (e.g., kernels 1-4) of locally connected layer 508 are convolved exclusively against a certain portion of image 502. As such, the locally connected layer displays little spatial invariance.

As described in the present embodiment, however, the low-rank locally connected (LRLC) layers of the present embodiment (e.g., "relaxed" layer 506) uses a kernel for each spatial location generated from combining a shared basis set of kernels (e.g., "relaxed" layer 506). Both the kernel basis set and the combining weights of "relaxed" layer 506 can be learned end-to-end through optimization. Thus, the number of kernels in the kernel basis set can determine the degree of relaxation of spatial invariance of the "relaxed" layer 506

Example Methods

Figure 6:
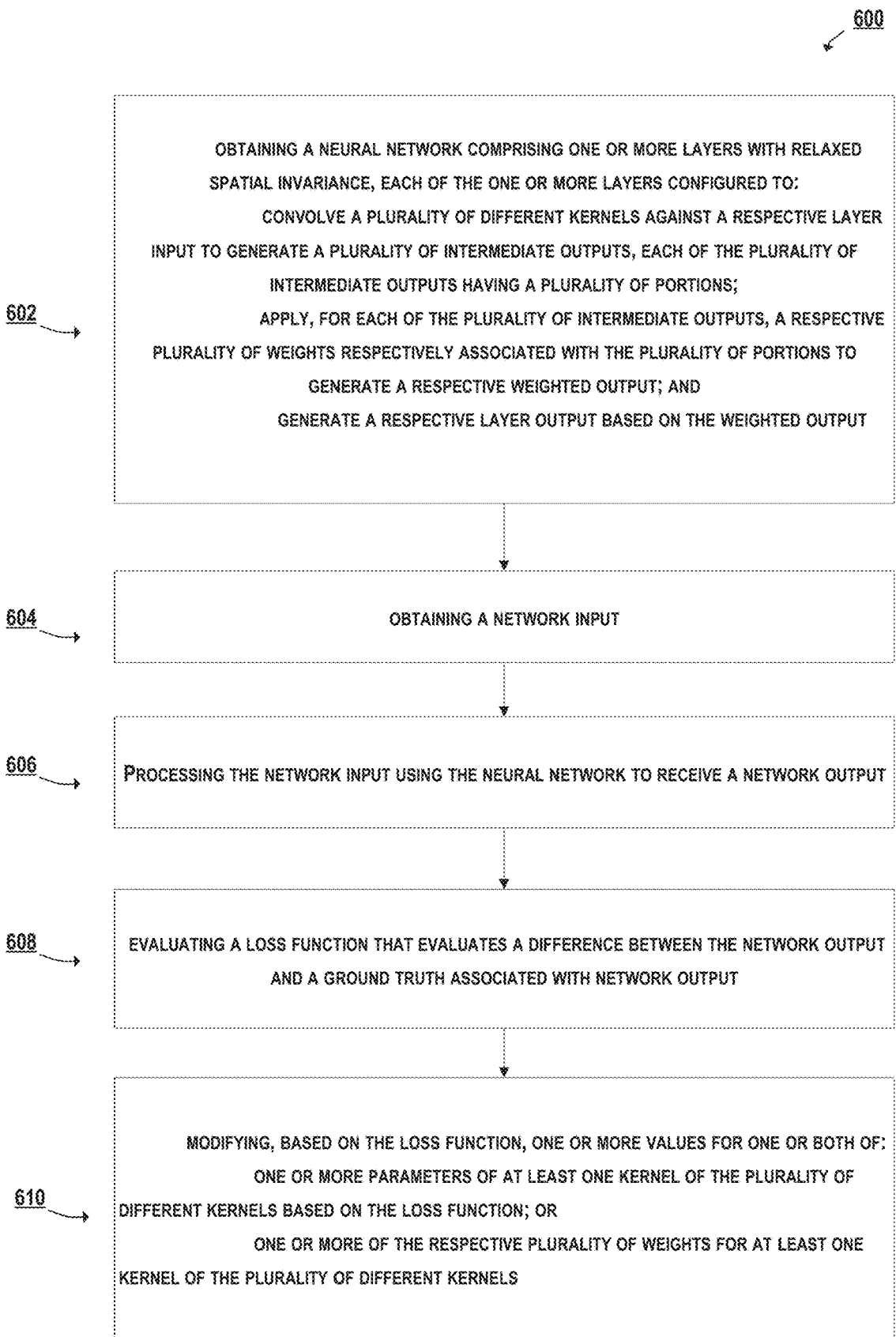
FIG. 6 depicts a flow chart diagram of an example method according to example embodiments of the present disclosure.

FIG. 6 depicts a flow chart diagram of an example method 600 according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can be configured to obtain a neural network comprising one or more layers with relaxed spatial invariance. The neural network can be configured to receive a respective layer input. In some implementations, a respective layer input can be a network input or can be an output from a previous layer of the network representing a lower dimensional representation of a network input. A network input (e.g., an input to the neural network) can be an image, a video, a document, audio, a point cloud, medical imaging data, medical examination and/or diagnostic text, a spectrogram dataset, or any other form of input that can be processed by the network. Further, the network input and/or the respective layer input can, in some implementations, be represented using one or more dimensions and/or channels (e.g., a height, width, depth, channels, etc.). As an example, a network image input can be represented with a height dimension, a width dimension, and a depth dimension corresponding to RGB values of the input image.

Each of the one or more layers can be configured to convolve a plurality of different kernels against a respective layer input to generate a plurality of intermediate outputs, each of the plurality of intermediate outputs having a plurality of portions. A kernel can include a matrix or tensor of values defined by height and width dimensions and a depth dimension which may correspond to a number of channels. Solely for simplicity of explanation, example kernels will be discussed herein with depth equal to 1, however, the different kernels described herein can have a depth value greater than one as well, depending on implementation choices. To provide an example, a kernel can have a height of 2 and a width of 2, and can include 4 values (e.g., 1,0,0,1, etc.). The kernel can be of any dimensions less than, equal, or greater to the respective dimensions of the respective layer input. As an example, a respective layer input may have dimensions of 55×55 while a kernel may have dimensions of 5×5. In some implementations, each kernel of the plurality of kernels can have different values and/or dimensions. As an example, a first kernel may have a height of 3 and a width of 4, while a second kernel can have a height of 5 and a width of 3, each of the first and second kernel having different values and/or identical values in some locations of the kernel matrix. Each kernel of the plurality of kernels can be convolved against the respective layer input to generate a plurality of intermediate outputs. In some implementations, each intermediate output can correspond to the convolution of a kernel across the respective layer input. As an example, four kernels being convolved against the respective layer input can generate four intermediate outputs that are respectively associated with the four kernels.

The intermediate outputs can have a plurality of portions. As an example, each intermediate output with dimensions of 50×50 can include 2,500 portions that correspond to the 2,500 cells of the intermediate output. Alternatively, some portions can include multiple cells from the intermediate output. As one example, an intermediate output can include four equal portions of 25×25. In such fashion, each of the intermediate outputs can be divided into the same quantity and dimensionality of portions. In some implementations, the dimensionality and/or quantity of portions can be modified. As an example, the intermediate outputs can have 15 different portions of various dimensions to more accurately identify objects in the intermediate output. In some implementations, the dimensionality and/or quantity of portions can be trained/learned, as will be discussed in greater detail with reference to the figures.

Each of the one or more layers can apply, for each of the plurality of intermediate outputs, a respective plurality of weights respectively associated with the plurality of portions to generate a respective weighted output.

Each of the one or more layers can generate a respective layer output based on the weighted output. The respective plurality of weights can be respectively associated with the plurality of portions. As an example, a first intermediate output can include four portions, and a plurality of weights can be respectively applied to each of the portions (e.g., applying a weight of 0.3 to a first portion, a weight of 0.7 to a second portion, a weight of 0.2 to a third portion, a weight of 0.5 to a fourth portion, etc.). A second intermediate output can include four portions, and a plurality of different and/or identical weights can be respectively applied to those portions.

In some implementations, the respective plurality of weights for each of the intermediate outputs can include a plurality of sums respectively of a plurality of row weight values and a plurality of column weight values. More particularly, weights can be respectively associated with values included in the intermediate output matrix. As an example, a 5×5 intermediate output matrix can include 25 values, each with respectively associated weights (e.g., 25 weights). Each of the weights can be a function of a row and column weight value for the intermediate output matrix. In such fashion, a 5×5 intermediate output matrix would, for example, include 5 row values and 5 column values, which can be used to produce the 25 weight values. These row and column values can be included in the respective plurality of weights for an intermediate output. For example, the row and column weights can be the learned weight values, thereby reducing the parameter size of the model (e.g., a reduction from 25 to 10 for the example weights).

In some implementations, the weights applied to the portions of the intermediate outputs can include a respective plurality of learned weight parameter values (e.g., a scalar value associated with each portion, a plurality of scalar values associated with each portion, etc.). In such fashion, the learned weight parameter values can be trained, as will be discussed in greater detail with regards to the figures.

At 604, the computing system can obtain a network input. A network input (e.g., an input to the neural network) can be an image, a video, a document, audio, a point cloud, medical imaging data, medical examination and/or diagnostic text, a spectrogram dataset, or any other form of input that can be processed by the network. Further, the network input and/or the respective layer input can, in some implementations, be represented using one or more dimensions and/or channels (e.g., a height, width, depth, channels, etc.). As an example, a network image input can be represented with a height dimension, a width dimension, and a depth dimension corresponding to RGB values of the input image.

At 606, the computing system can process the network input using the neural network to receive a network output. The network output can be a convolutional "composite" of the convolutional outputs (e.g., intermediate outputs) associated with each kernel of the plurality of kernels. The "contribution" of each intermediate output in the convolutional "composite" can be based on the respective weights associated with each portion of each intermediate output.

At 608, the computing system can evaluate a loss function that evaluates a difference between the network output and a ground truth associated with network output. The neural network 204 can be trained using the loss function (e.g., a gradient thereof). For example, the values of the parameters of the "relaxed" layer and/or the learned weight prediction subnetwork(s) in the neural network can be updated as the loss function is backpropagated through the neural network.

At 610, the computing system can modify, based on the loss function, one or more values for one or both of: one or more parameters of at least one kernel of the plurality of different kernels based on the loss function, or one or more of the respective plurality of weights for at least one kernel of the plurality of different kernels. More particularly, the parameters of the layer(s) with relaxed spatial invariance can be modified based on the loss function that evaluates a difference between a training output and a ground truth associated with the training input. Parameters of the layer(s) with relaxed spatial invariance can include, for instance, kernel parameters (e.g., height, width, channel depth, etc.), kernel weights, a spatial rank parameter (e.g., a parameter configured to partially control a number of applied kernels), bias value(s), and any other parameters associated with the layer(s) with relaxed spatial invariance.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although certain figures respectively depict steps performed in a particular order for purposes of illustration and discussion, the methods of the present disclosure are not limited to the particularly illustrated order or arrangement. The various steps of the methods described herein can be omitted, rearranged, combined, and/or adapted in various ways without deviating from the scope of the present disclosure.

What is claimed is:
1. A computing system for relaxing spatial invariance in a neural network, comprising:
  one or more processors; and
  one or more non-transitory computer-readable media that collectively store:

a neural network comprising one or more layers with relaxed spatial invariance, wherein each of the one or more layers is configured to:
  receive a respective layer input;
  convolve a plurality of different kernels against the respective layer input to generate a plurality of intermediate outputs, each of the plurality of intermediate outputs having a plurality of portions;
  relax spatial invariance of the plurality of different kernels by applying, for each of the plurality of intermediate outputs, a respective plurality of weights respectively associated with the plurality of portions to generate a respective weighted output; and
  generate a respective layer output based on the weighted outputs; and
instructions that, when executed by the one or more processors, cause the computing system to perform operations, the operations including using the neural network to process a network input to generate a network output.

2. The computing system of claim 1, wherein, for at least one of the one or more layers, the respective plurality of weights for each of the intermediate outputs comprises a respective plurality of learned weight parameter values.

3. The computing system of claim 1, wherein, for at least one of the one or more layers, the respective plurality of weights for each of the intermediate outputs comprises, for each intermediate output, a plurality of sums respectively of a plurality of row weight values and a plurality of column weight values.

4. The computing system of claim 1, wherein at least one of the one or more layers comprises one or more learned subnetworks that receive one or more portions of the respective layer input and, in response, predict the respective plurality of weights for one or more of the intermediate outputs.

5. The computing system of claim 1, wherein each of the one or more layers is further configured to apply, to the respective layer output, a respective bias, the respective bias comprising a plurality of bias values respectively associated with a plurality of rows and a plurality of columns of the respective layer output.

6. The computing system of claim 1, wherein the network input comprises:
  an image;
  a video;
  a point cloud;
  text; or
  a spectrogram dataset.

7. The computing system of claim 1, wherein the network output identifies:
  one or more objects contained in the network input;
  one or more properties of the network input; or
  one or more frequency positions of the network input.

8. The computing system of claim 1, wherein the number of kernels in the plurality of different kernels is based at least in part on a user-specified spatial rank parameter.

9. The computing system of claim 1, further comprising:
  pre-processing the network input to normalize a spatial configuration of one or more objects included in the network input.

10. The computing system of claim 1, wherein the sum of weights of the plurality of weights respectively associated with a portion of the plurality of portions is 1.

11. The computing system of claim 1, wherein each of the plurality of different kernels comprises a tensor having a channel depth greater than one.

12. The computing system of claim 1, wherein for each of the one or more layers, the respective layer input comprises a plurality of channels, and wherein to convolve the plurality of different kernels against the respective layer input the layer is configured to convolve each of the plurality of different kernels against all of the plurality of channels of the respective layer input.

13. A computer-implemented method, comprising:
  obtaining, by one or more computing devices, a neural network comprising one or more layers with relaxed spatial invariance, each of the one or more layers configured to:
    convolve a plurality of different kernels against a respective layer input to generate a plurality of intermediate outputs, each of the plurality of intermediate outputs having a plurality of portions;
    apply, for each of the plurality of intermediate outputs, a respective plurality of weights respectively associated with the plurality of portions to generate a respective weighted output; and
    generate a respective layer output based on the weighted output;
  obtaining, by the one or more computing devices, a network input;
  processing, by the one or more computing devices, the network input using the neural network to receive a network output;
  evaluating, by the one or more computing devices, a loss function that evaluates a difference between the network output and a ground truth associated with network output;
  modifying, by the one or more computing devices and based on the loss function, one or more values for one or both of:
    one or more parameters of at least one kernel of the plurality of different kernels; or
    one or more of the respective plurality of weights for at least one kernel of the plurality of different kernels; and
  providing, by the one or more computing devices, the plurality of different kernels and the respective plurality of weights as a trained model.

14. The computer-implemented method of claim 13, wherein modifying the values comprises modifying values for the one or more parameters of at least one kernel of the plurality of different kernels.

15. The computer-implemented method of claim 13, wherein modifying the values comprises modifying values for one or more of the respective plurality of weights for at least one kernel of the plurality of different kernels.

16. The computer-implemented method of claim 13, further comprising:
  modifying, by the one or more computing devices and based on the loss function, at least one bias value of a plurality of bias values.

17. The computer-implemented method of claim 13, further comprising:
  modifying, by the one or more computing devices and based on the loss function, a spatial rank parameter, the spatial rank parameter configured to control a number of kernels in the plurality of kernels.

18. The computer-implemented method of claim 13, further comprising:

modifying, by the one or more computing devices and based on the loss function, one or more subnetwork parameters included in one or more learned subnetworks included in at least one of the one or more layers, the one or more learned subnetworks configured to receive one or more portions of the respective layer input and, in response, predict the respective plurality of weights for one or more of the intermediate outputs.

19. One or more tangible, non-transitory computer readable media storing computer-readable instructions that when executed by one or more processors cause the one or more processors to perform operations, the operations comprising:

obtaining a neural network comprising one or more layers with relaxed spatial invariance, each of the one or more layers configured to:
convolve a plurality of different kernels against a respective layer input to generate a plurality of intermediate outputs, each of the plurality of intermediate outputs having a plurality of portions;
apply, for each of the plurality of intermediate outputs, a respective plurality of weights respectively associated with the plurality of portions to generate a respective weighted output; and
generate a respective layer output based on the weighted output;

obtaining a network input;
processing the network input using the neural network to receive a network output;
evaluating a loss function that evaluates a difference between the network output and a ground truth associated with network output;
modifying, based on the loss function, one or more values for one or both of:
one or more parameters of at least one kernel of the plurality of different kernels; or
one or more of the respective plurality of weights for at least one kernel of the plurality of different kernels; and
providing the plurality of different kernels and the respective plurality of weights as a trained model.

20. The one or more tangible, non-transitory media of claim 19, wherein the operations further comprise modifying, based on the loss function, one or more subnetwork parameters included in one or more learned subnetworks included in at least one of the one or more layers, the one or more learned subnetworks configured to receive one or more portions of the respective layer input and, in response, predict the respective plurality of weights for one or more of the intermediate outputs.

* * * * *